UNITED STATES PATENT OFFICE.

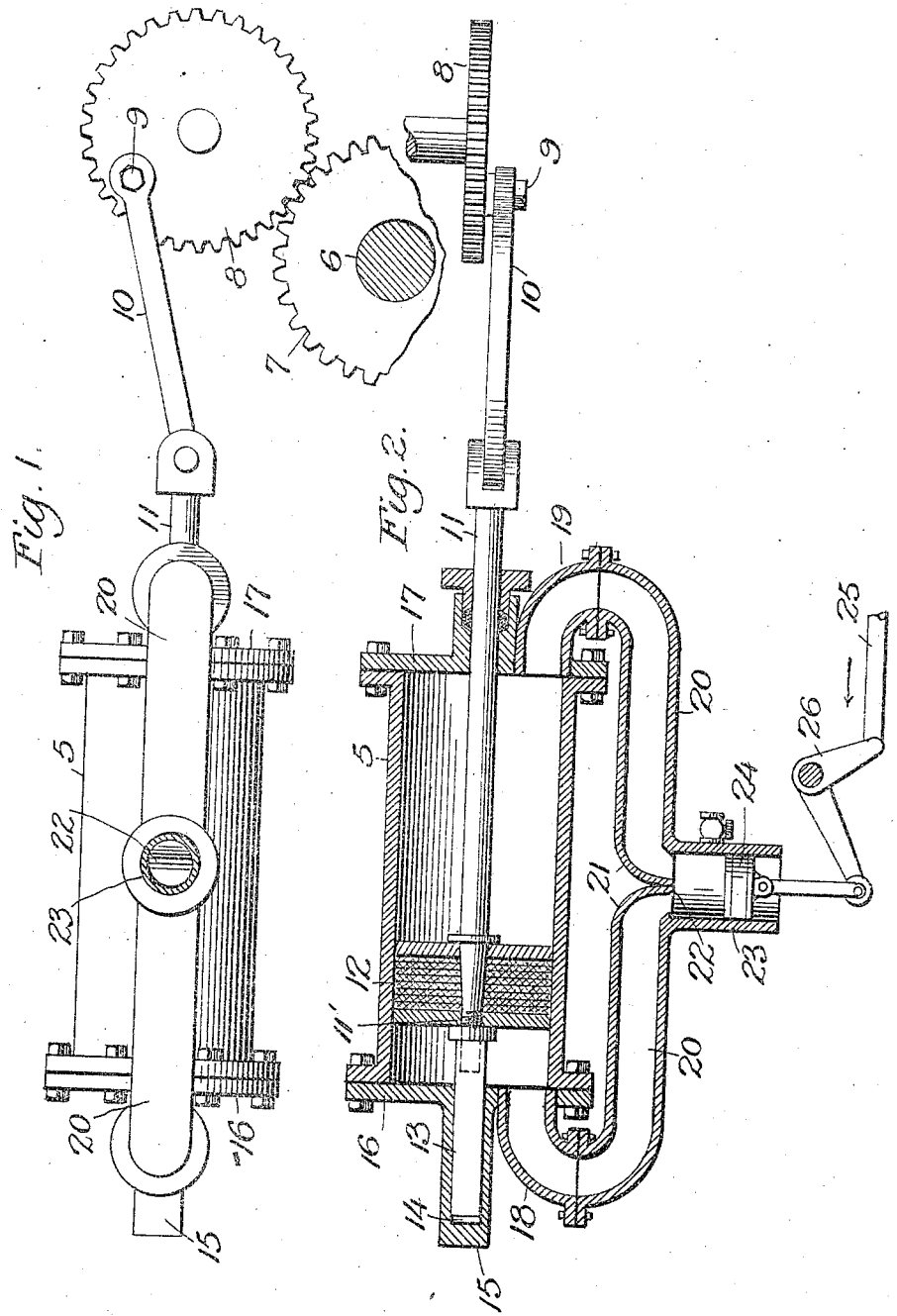

HERBERT C. WASHBURN, OF SUFFERN, NEW YORK.

VEHICLE-BRAKE.

1,074,482.

Specification of Letters Patent. Patented Sept. 30, 1913.

Application filed February 14, 1912. Serial No. 677,420.

*To all whom it may concern:*

Be it known that I, HERBERT C. WASHBURN, a citizen of the United States, residing at Suffern, in the county of Rockland and State of New York, have invented new and useful Improvements in Vehicle-Brakes, of which the following is a specification.

This invention relates to brakes for vehicles and its object is to provide certain pneumatic means controlled by the operator of the vehicle so that upon the application of certain controlling means, the rotation of the wheel may be prevented, as will be more fully described in the following specification, set forth in the claim and illustrated in the drawings, wherein, Figure 1 is a side elevation of the brake. Fig. 2 is a sectional plan view of the device.

A cylinder 5 is rigidly secured to the frame of the vehicle, whose axle 6 is rotated in the usual manner by the necessary motor, and as the axle rotates and carries with it the pinion 7, a gear wheel 8 which meshes with the pinion is also rotated. The gear wheel 8 is provided with a stud 9, carrying a pitman 10 connected with the piston rod 11 of the piston 12 contained in the cylinder 5. The rod 11 extends beyond the piston and is squared at its end 13 to fit in the cylinder. Each of the heads 16 and 17 are provided with pipes 18 and 19 connected with a common tube 20 divided at its center by means of the walls 21 which terminate in a valve seat 22 at the lower end of a cylinder 23. This valve seat 22 is provided for a piston 24 which may be thrown into place by means of a rod 25, operated at the seat of the driver of the vehicle and which actuates the bell crank lever 26 to throw the piston 24 down upon the seat 22 and prevent communication between the two portions of the pipe 20 connected with the outlets 18 and 19.

As long as the vehicle is moving and the axle 6 rotating, the gear wheel 8 is moving and the piston 12 operates to circulate air through the outlets 18 and 19, the pipe 20 and the lower portion of the cylinder 23. When the rod 25 is operated to throw the piston 24 down upon the seat 22, the communication is interrupted between the two sections of the pipe 20 and the air is compressed in one or the other end of the cylinder 5 so as to offer an obstruction to the movement of the piston 12 and check the movement of the wheel 8 and axle 6.

With this device located at a convenient point on a vehicle, the movement of the axle and wheels may be checked without any severe shock to the machine or vehicle itself when the rod 25 is operated by means of a brake lever near the dash board or a lever conveniently located for the driver of the vehicle and the compressible nature of air is sufficient to prevent any sudden stoppage which would be injurious to the vehicle.

This device may be located at any convenient point on the vehicle and it is obvious that its parts may be otherwise modified and arranged without departing from the essential features above described.

The rod 11 is preferably made with a threaded end 11′ which screws into the squared end 13 so the packing 12 may be compressed to at all times form a perfect air tight wall. Instead of operating the device by air alone, oil or other liquids may be used to circulate through the ends of the cylinder, and a ball and socket joint may connect the pitman 10 with the rod 11 so the packing may be adjusted without disconnecting any of the parts.

What I claim as new and desire to secure by Letters Patent is,—

In a vehicle brake, the combination with a geared axle of the vehicle; of a second gear meshing with the said axle-gear, a cylinder having heads provided with openings, a piston within the cylinder, a piston rod passing through the piston and having one end squared, a pitman connecting the other end of the piston with the second named gear, a pipe inserted in each end of the cylinder, a second pipe having two branches connecting with the two first named pipes and further provided with a valve seat at the point of division, a valve operating in the trunk of the second pipe, a stem carried by the valve, a bell crank connected with the valve stem, and means for operating the bell crank.

In testimony whereof I affix my signature in presence of two witnesses.

HERBERT C. WASHBURN.

Witnesses:
ALEX. H. MERRITT,
CORA L. ABRAMS.